United States Patent [19]
Manning

[11] Patent Number: 5,861,087
[45] Date of Patent: Jan. 19, 1999

[54] APPARATUS FOR AUGMENTING THE COALESCENCE OF A COMPONENT OF AN OIL/WATER MIXTURE

[75] Inventor: Dennis K. Manning, Claremore, Okla.

[73] Assignee: National Tank Company, Houston, Tex.

[21] Appl. No.: 747,277

[22] Filed: Nov. 12, 1996

[51] Int. Cl.⁶ .............................. C25B 9/00; C02F 1/463
[52] U.S. Cl. .......................................... 204/272; 204/671
[58] Field of Search ................................ 204/272, 273, 204/671

[56]  References Cited

U.S. PATENT DOCUMENTS

| | | | |
|---|---|---|---|
| 1,405,124 | 1/1922 | Harris . | |
| 1,558,382 | 10/1925 | Marx . | |
| 1,565,997 | 12/1925 | Girvin . | |
| 3,718,540 | 2/1973 | Bailey | 204/272 |
| 3,758,399 | 9/1973 | Pendergrass | 204/228 |
| 3,801,492 | 4/1974 | King | 204/671 |
| 3,871,989 | 3/1975 | King | 204/272 X |
| 4,116,790 | 9/1978 | Prestridge | 204/188 |
| 4,341,617 | 7/1982 | King | 204/302 |
| 4,601,834 | 7/1986 | Bails et al. | 210/748 |
| 4,801,370 | 1/1989 | Arnesen | 204/302 |

FOREIGN PATENT DOCUMENTS

| | | |
|---|---|---|
| 94400461.3 | 3/1994 | European Pat. Off. . |
| PCTGB91/01732 | 10/1991 | WIPO . |
| WO 95-27548 | 11/1995 | WIPO ........................ B01D 17/038 |

*Primary Examiner*—Donald R. Valentine
*Attorney, Agent, or Firm*—Head, Johnson & Kachigian

[57]   ABSTRACT

An apparatus for augmenting the coalescence of a component of an oil/water mixture employs an elongated cylindrical vessel having a fluid inlet at one end and a fluid outlet at the other end and an electrically conductive sidewall. An electrode is positioned within the vessel, concentric with the vessel sidewall, and between the fluid inlet and fluid outlet. An electrical potential is applied between the electrode and the vessel sidewall. A distributor plate is positioned within the vessel and between the vessel fluid inlet and the electrode. The distributor plate is shaped to cause fluid passing through it to move in a spiral pattern within the vessel and around the electrode as the fluid moves towards the fluid outlet.

20 Claims, 3 Drawing Sheets

APPARATUS FOR AUGMENTING THE COALESCENCE OF A COMPONENT OF AN OIL/WATER MIXTURE

BACKGROUND OF THE INVENTION

Electrostatic treatment of oil and water has been used by the oil industry for many years to aid in the separation of water from an oil-continuous stream. Treating a water-in-oil emulsion by passing it through a high voltage electrostatic field has been shown to promote rapid coalescence of the water droplets leading to rapid separation. Electrostatic voltage sources includes AC, DC and combined AC/DC.

For background information relating to the basic subject matter of this invention, reference may be had to U.S. Pat. Nos. 4,601,834 and 4,747,921, and to pending U.S. patent application Ser. No. 08/381,196 entitled "METHOD AND APPARATUS FOR OIL/WATER SEPARATION USING A DUAL ELECTRODE CENTRIFUGAL COALESCER", filed 31 Jan. 1995. These two patents and the application are incorporated herein by reference. For further background information, reference can be had also to the following patents:

| PATENT NO. | INVENTOR | TITLE |
| --- | --- | --- |
| PCT WO 92/05853 | Bailes et al | Separation of the Components Of Liquid Dispersions |
| EPC 0 617 115 A1 | Prevost et al | Dipositif et procédéd de séparation de phases de densités et de conductivités différentes par électrocoalescence et centrifugation |
| 1558382 | Marx | Electrocentrifugal Separation |
| 1565997 | Girvin | Centrifugal Dehydrator |
| 3758399 | Pendergrass | Pulse Imparter |
| 4116790 | Prestridge | Method and Apparatus For Separation of Fluids With An Electric Field and Centrifuge |
| 4341617 | King | Liquid Treater Having Electrical Charge Injection Means |
| 4601834 | Bailes et al | Settling of Liquid Dispersions |
| 4801370 | Arnesen | Field Generator For Generating An Electrostatic Field In A Body Of Liquid |

BRIEF SUMMARY OF THE INVENTION

This invention provides an apparatus for augmenting the coalescence of a component of an oil/water mixture, that is, for coalescence of water in an oil emulsion or for the coalescence of oil in a water emulsion, or for coalescence of water or oil components of a non-emulsified mixture.

The apparatus includes an elongated cylindrical vessel having an inlet end and an outlet end. While the invention is not so limited, it is preferably practiced in a cylindrical upright elongated vessel having a fluid inlet in the inlet end and a fluid outlet in the outlet end, fluid flowing vertically within the vessel from the inlet end to the outlet end.

An elongated first electrode of external diameter less than that of the vessel sidewall is supported concentrically within the vessel.

Coalescence is augmented by subjecting fluid flowing through the vessel to an electrical field established between the electrode and the vessel wall. The effectiveness of the apparatus is enhanced by causing the fluid to flow in a spiral or circuitous path between the inlet and outlet as the fluid flows in the annular space between the electrode and the vessel wall. This spiraled flow pattern is accomplished by positioning in the vessel, between the vessel inlet and the electrode, a vaned distributor plate or a distributor plate having short lengths of pipe inclined at an angle.

The distributor plate as employed in the lower portion of an upright cylindrical vessel with a lower inlet and an upper outlet is particularly useful with a vessel having, as a portion thereof, one or more tubular electrodes.

In this embodiment a first tubular electrode is open at its bottom and top ends and is supported in electrical isolation from the vessel. An elongated second tubular electrode of external diameter less than the first tubular electrode is supported concentrically within the first tubular electrode. The second tubular electrode is in electrical isolation with the first tubular electrode and is open at its top and bottom ends. An elongated cylindrical electrode of external diameter less than the second tubular electrode is positioned concentrically within the second tubular electrode and is electrically isolated from the second tubular electrode.

The arrangement of a central cylindrical electrode with two cylindrical tubular electrodes within a tubular sidewall provides three separate annular flow paths for fluid to flow spirally between the vessel inlet and outlet ends. The flow paths are paralleled to each other.

A voltage source supplies a high voltage that may be either a direct current voltage, either pulsating or continuous, or an alternating current voltage. Circuitry is employed to electrically connect a first pole of the voltage source to the first tubular electrode and to the cylindrical electrode in parallel. The second pole of the voltage source is connected to the vessel sidewall and to the second tubular electrode in parallel.

The second pole of the voltage source may be grounded, that is, the vessel wall and the second tubular electrode may be maintained at ground potential with a voltage applied to the first tubular electrode and to the cylindrical electrode. While different voltage may be applied to the first tubular electrode compared to that supplied to the cylindrical electrode, in the preferred and illustrated embodiment the same voltage is supplied to these two electrodes in parallel. Further, while the second tubular electrode and the vessel wall may be maintained in an insulated relationship with respect to ground, in the preferred embodiment these elements are grounded and one pole of the voltage source is likewise grounded.

A better understanding of the invention will be obtained from the following description of the preferred embodiments, taken in conjunction with the attached drawings.

DETAILED DESCRIPTION OF THE PREFERRED EMBODIMENTS

Figure 1:
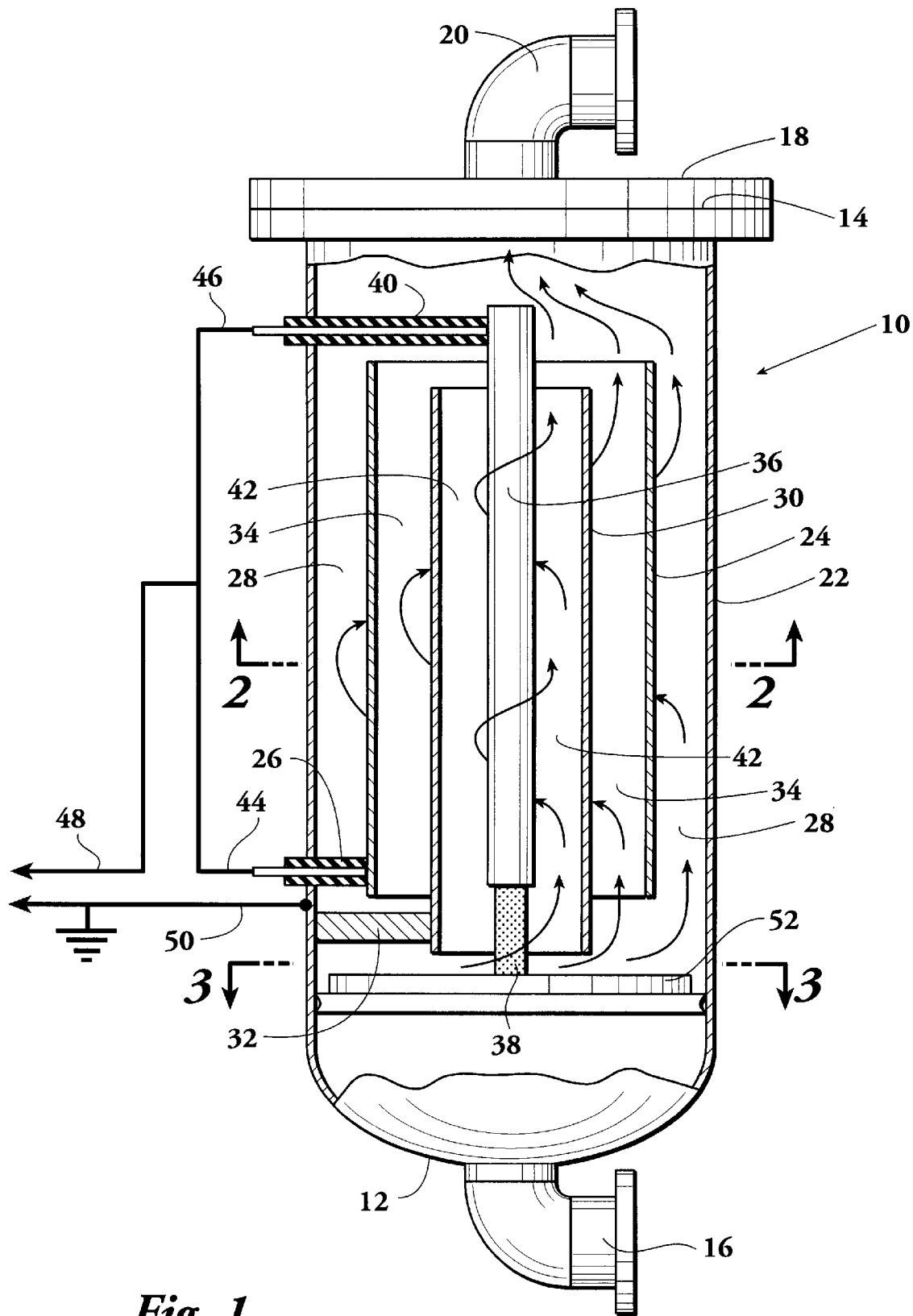
FIG. 1 is an elevational view of an elongated upright cylindrical vessel that employs multiple tubular electrodes and a central cylindrical electrode arranged for paralleled fluid flow from the inlet to the outlet end of the vessel, the fluid flow occurring between opposed electrodes having opposite polarities. A vaned distributor plate is employed to cause the flow of the fluid within the vessel to assume a spiraled pattern as the fluid progresses from the inlet to the outlet end.
Figure 2:
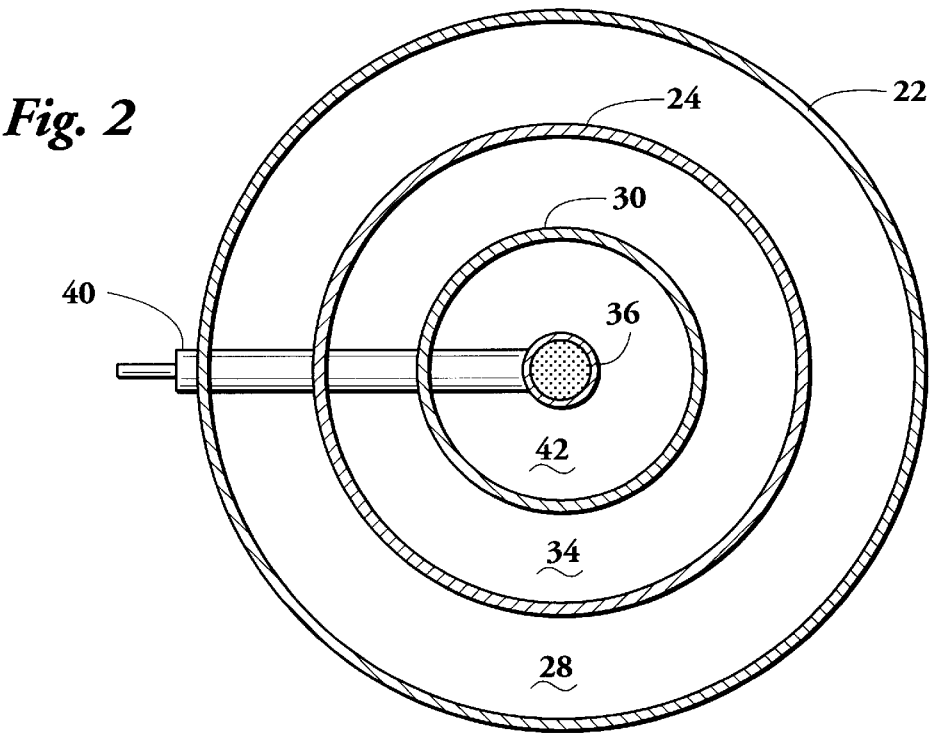
FIG. 2 is a cross-sectional view taken along the line 2—2 of FIG. 1, showing the relationship of the tubular electrodes to the vessel cylindrical sidewall and to the cylindrical central electrode.

Referring now to FIGS. 1 through 4, a vessel is generally indicated by numeral 10, the vessel being upright and cylindrical and having an inlet end 12 and an outlet end 14. At inlet end 12 is conduit 16 by which emulsion is conveyed into the interior of vessel 10. The outlet end 14 is covered by flange plate 18 having an outlet conduit 20. Thus, vessel 10 is a fluid pass-through vessel, that is, it does not provide for separation of one fluid component from another but is intended to treat a water/oil mixture to augment the coalescence of one component from another. A water/oil mixture, after flowing from outlet 20, will be passed for further processing steps wherein the mixture will be separated into at least two individual components. Vessel 10 is configured to enable the practice of a method of treating a mixture, whether a non-emulsified mixture, an oil-in-water emulsion or a water-in-oil emulsion to augment the coalescence of either water or oil, depending upon the nature of the mixture, to thereby improve subsequent separation of these components.

Vessel 10 has a cylindrical wall 22 that is preferably formed of conductive material, such as metal, which functions as one electrode. Positioned within the interior of the vessel is an elongated first tubular electrode 24 that is formed of metal and is open at each end. Electrode 24 may be supported in a variety of ways, such as by use of an insulator 26. More than one such insulator 26 may be employed as necessary to adequately support first tubular electrode 24 within the vessel.

The exterior diameter of first tubular electrode 24 is less than the internal diameter of vessel sidewall 22 leaving an annular space 28 therebetween through which fluid flows as it passes from inlet conduit 16 to outlet conduit 20.

Positioned concentrically within first tubular electrode 24 is a second tubular electrode 30 that is held in position by a support member 32. In the illustrated embodiment, second tubular electrode 30 is maintained at the same potential as the vessel cylindrical sidewall 22 which, preferably, is at ground potential and therefore, support member 32 does not need to be an insulator.

Second tubular electrode 30 is open at each end. It has an external diameter less than the internal diameter of first tubular electrode 24. An annular space 34 is thus formed between first and second tubular electrodes 24 and 30.

Positioned concentrically within the interior of vessel sidewall 22 is a cylindrical electrode 36. This electrode, which is preferably cylindrical rather than tubular, may be formed of a tubular member but if so it is closed against fluid flow through the interior. Cylindrical electrode 36 is supported by a vertical insulator 38 and by an insulator 40 that extends from vessel sidewall 22.

The external diameter of cylindrical electrode 36 is less than the interior diameter of second tubular electrode 30 providing an annular space 42 therebetween.

A conductor 44 extends through insulator 26 to connect with first tubular electrode 24. In like manner, conductor 46 extends through insulator 40 to provide electrical continuity with cylindrical electrode 36. Conductors 44 and 46 are connected in parallel with each other and in series with conductor 48. By means of conductor 50, vessel sidewall 22 is grounded. This ground potential is applied through support member 32 to second tubular electrode 30. A voltage is applied across conductors 48 and 50. By this arrangement, two of the electrodes are at ground potential, that is, vessel sidewall 22 and second tubular electrode 30, whereas the other two electrodes, that is, first tubular electrode 24 and cylindrical electrode 36 are at a different potential.

This arrangement provides three annular passageways through the vessel, that is, passageways 28, 34 and 42. Fluid flowing through the vessel from inlet conduit 16 to outlet conduit 20, passes in parallel through one of these three annular passageways and in each of the passageways the fluid is subjected to a voltage potential. The flow passageways do not require fluid direction flow reversal.

The methods of supporting the electrodes and the methods of conveying electrical continuity to them as illustrated in FIG. 1 are emblematic and other systems and devices can be provided to connect electrical energy to the electrodes.

Positioned within the lower portion of vessel 10, and specifically between inlet end 12 and the lower ends of the electrodes, is a distributor plate 52. This plate has two basic functions. First, it provides a means of supporting insulator 38 to thereby support cylindrical electrode 36. A more important function is that the distributor plate 52 imparts a spiral flow pattern to fluid flowing from inlet conduit 16 into the interior of the vessel.

Figure 4:
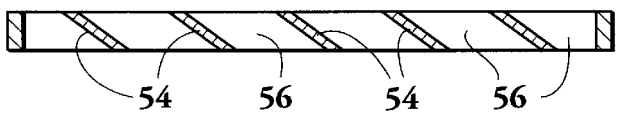
FIG. 4 is a partial cross-sectional view of the distributor plate taken along the line 4—4 of FIG. 3.
Figure 3:
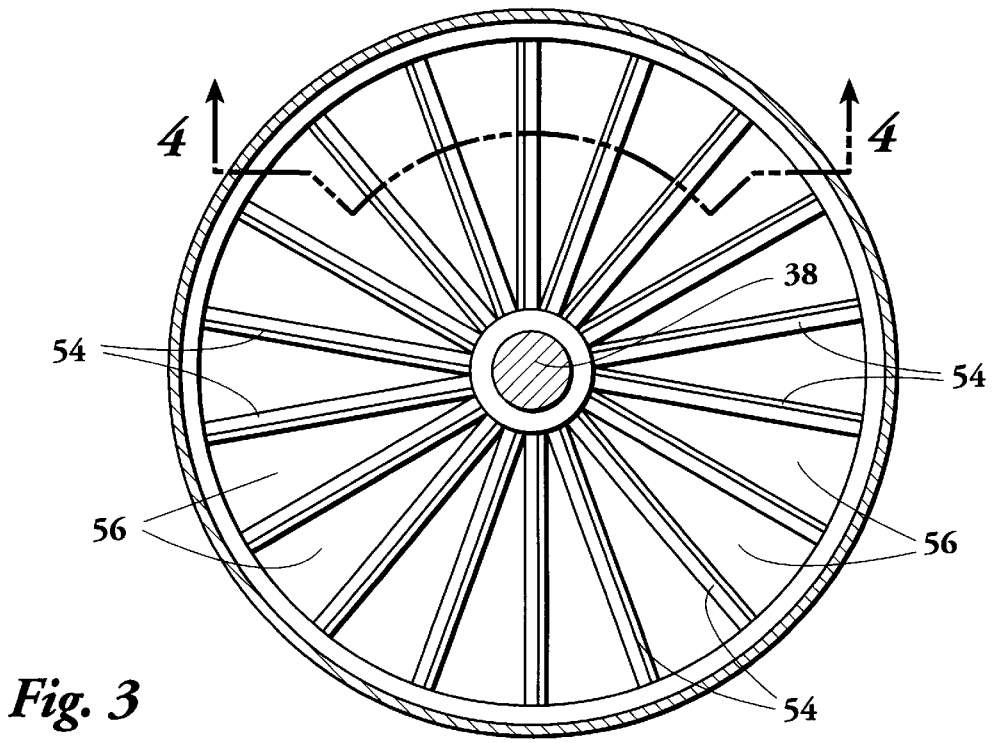
FIG. 3 is a cross-sectional view taken along the line 3—3 of FIG. 1 showing a top view of a distributor plate having radial angular vanes to impart a spiral flow path to the fluid flow within the vessel.

This is achieved by forming distributor plate 52 (as best seen in FIGS. 3 and 4) with inclined radial vanes 54. The vanes are, as shown in the cross-sectional view of FIG. 4, relatively flat with open spaces 56 between them. The flat vanes are inclined at an angle so that fluid flowing upwardly through the plate flows in a spiral path towards vessel outlet end 14.

The spiral flow path insures a more uniform distribution of fluid flow through passageways 28, 34 and 42. Further, the spiral fluid flow tends to cause the heavier components of a mixture, such as water, to migrate outwardly towards vessel wall 22.

Figure 6:
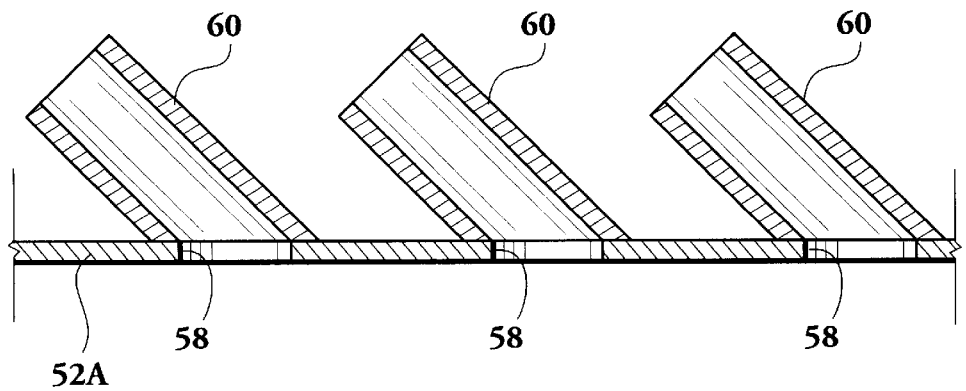
FIG. 6 is a partial cross-sectional view of a distributor plate, taken along the line 6—6 of FIG. 5.
Figure 5:
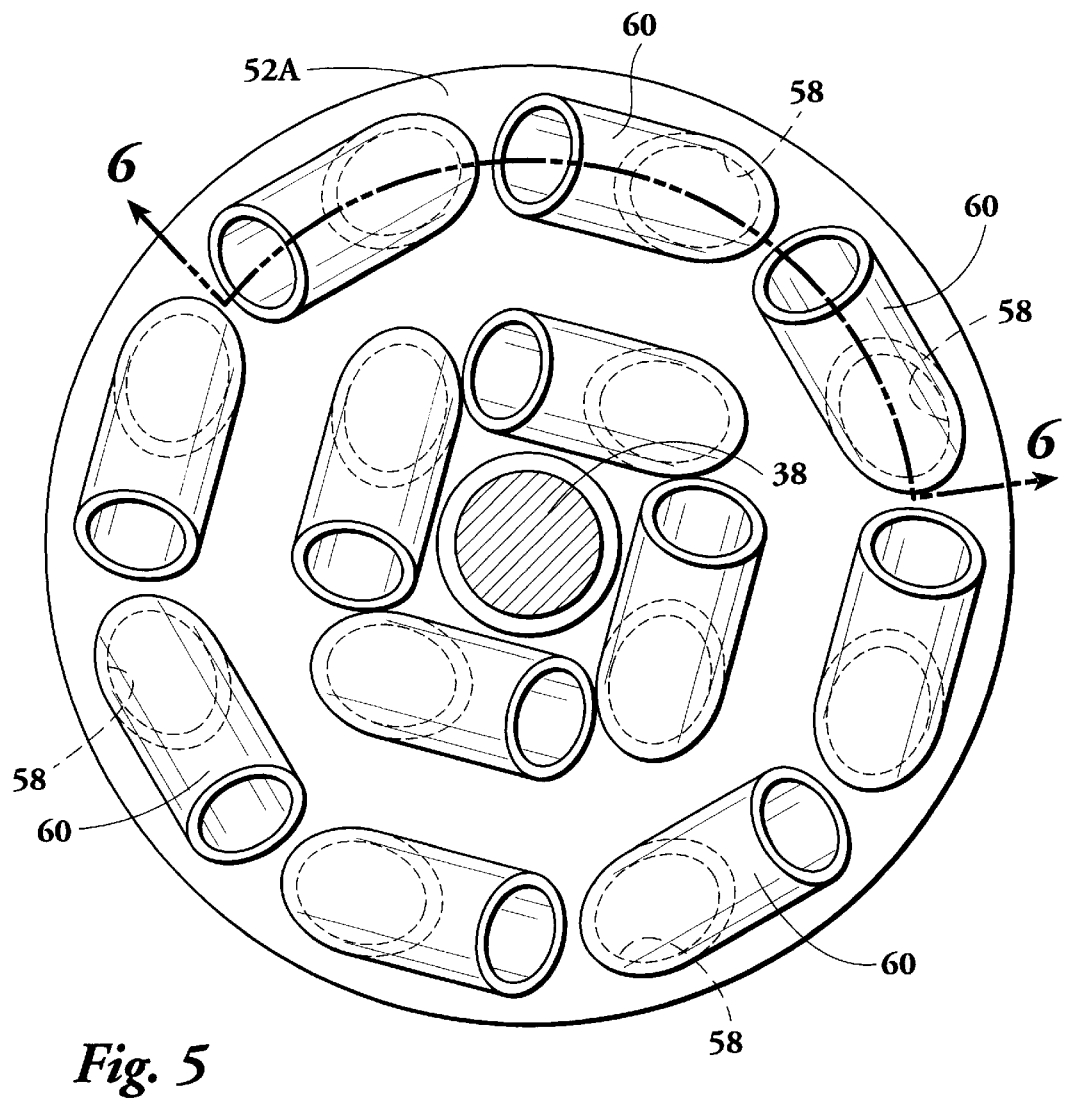
FIG. 5 is a top plan view of a different type of distributor plate that employs short length tubular members, each opened at both ends, the tubular members being angled with respect to the plane of the distributor plate so that fluid flowing through the tubular members is caused to move in a spiral path within the vessel.

FIGS. 5 and 6 show an alternate embodiment of a distributor plate designated as 52A. In this embodiment openings 58 are formed in the plate through which fluid flows as it passes from inlet conduit 16 to the interior of the vessel below the electrodes. Affixed to the plate coincident with openings 58 are short-length tubular members 60 that are open at their upper and lower ends. Distributor plate 52A of FIGS. 5 and 6 accomplishes essentially the same results as the radial vane distributor plate 52 but is a design that can be readily fabricated in most shops that are equipped to manufacture fluid processing equipment.

The apparatus for augmenting the coalescence of components of an emulsion as illustrated in FIGS. 1 through 6 may be employed with an AC voltage, a pulse DC voltage or a steady state DC voltage, all as commonly known in the fluid processing industry. The design provides a spiraled flow pattern which increases the duration during which fluid is subjected to electrical fields as the fluid flows through the vessel. Further, the spiral flow paths increase the contact of fluid with the electrodes and provides for more uniform distribution of fluid movement through the vessel.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An apparatus for augmenting the coalescence of a component of a mixture, comprising:

a cylindrical vessel having an inlet end and an outlet end with a fluid inlet communicating with the vessel adjacent said inlet end and a fluid outlet communicating with the vessel adjacent said outlet end, the vessel having a cylindrical axis and an electrically conductive sidewall;

at least one electrode of external diameter less than that of said vessel sidewall and supported concentrically within said vessel between said fluid inlet and said fluid outlet;

a conductor applying a voltage potential between said electrode and said vessel sidewall; and a distributor plate positioned within said vessel between said fluid inlet and below said electrode, the distributor plate being configured to cause fluid flowing within said vessel to flow past at least a substantial portion of the full length of said electrode in a spiraled pattern.

2. An apparatus for augmenting the coalescence of a component of a mixture according to claim 1 wherein said distributor plate includes spaced apart radially extending vanes, each vane having a plane that is at an angle relative to a plane of said vessel cylindrical axis.

3. An apparatus for augmenting the coalescence of a component of a mixture according to claim 1 wherein said distributor plate is in a plane at least substantially perpendicular to said vessel cylindrical axis and has a plurality of spaced apart openings therethrough, and including:

a plurality of short length pipes, one for each of said openings, a first end of each of said pipes being affixed to said distributor plate in register with one of said openings, a second end of each of said pipes being open, each pipe being inclined at an angle to said distributor plate, fluid flow from said inlet through said pipes having a spiral flow path imparted to it.

4. An apparatus for augmenting the coalescence of a component of an emulsion according to claim 1 wherein said electrode is tubular, a portion of fluid flow from said distributor plate to said outlet flowing therethrough.

5. An apparatus for augmenting the coalescence of a component of a mixture according to claim 1 wherein said electrode is supported at a lower end thereof by said distributor plate.

6. An apparatus for augmenting the coalescence of a component of a mixture according to claim 1 including an elongated first tubular electrode of external diameter less than said vessel sidewall and supported concentrically within and electrically isolated from said vessel, and including:

an elongated cylindrical electrode of external diameter less than said first tubular electrode and supported concentrically within said first tubular electrode providing an annular passageway between said cylindrical electrode and said first tubular electrode, said distribution plate being configured to cause fluid flowing through said annular passageway to flow in a spiral path.

7. An apparatus for augmenting the coalescence of a component of a mixture according to claim 6 including an elongated second tubular electrode of external diameter less than said first tubular electrode and supported concentrically within and in electrical isolation with said first tubular electrode and providing a second annular flow path between said first and second tubular electrode, said distributor plate being configured to cause fluid flowing through said second annular flow path to flow in a spiral path.

8. An apparatus for augmenting the coalescence of a component of a mixture according to claim 7 wherein said vessel sidewall and said second tubular electrode are grounded and wherein an electrical potential is applied to said first tubular electrode and said cylindrical electrode.

9. An apparatus for augmenting the coalescence of a component of a mixture according to claim 7 wherein said first tubular electrode, said second tubular electrode and said cylindrical electrode are all substantially concentrically supported within said vessel sidewall.

10. An apparatus for augmenting the coalescence of a component of a mixture according to claim 1 wherein said fluid inlet is positioned concentrically within said vessel inlet end.

11. An apparatus for augmenting the coalescence of a component of a mixture according to claim 1 wherein said fluid outlet is positioned concentrically within said vessel outlet end.

12. An apparatus for augmenting the coalescence of a component of a mixture according to claim 1 wherein said cylindrical electrode is supported by said distributor plate.

13. An apparatus for augmenting the coalescence of a component of a mixture according to claim 12 wherein said cylindrical electrode is electrically insulated from said distributor plate.

14. An apparatus for augmenting the coalescence of a component of a mixture, comprising:

a cylindrical vessel having an inlet end and an outlet end with a fluid inlet communicating with the vessel adjacent said inlet end and a fluid outlet communicating with the vessel adjacent said outlet end, the vessel having a cylindrical axis and an electrically conductive sidewall;

an elongated tubular electrode of external diameter less than that of said vessel sidewall and supported concentrically within said vessel above said fluid inlet and below said fluid outlet;

an elongated cylindrical electrode of external diameter less than said tubular electrode and supported concentrically within said tubular electrode providing an annular passageway between said cylindrical electrode and said first tubular electrode;

conductors for applying a voltage potential between electrodes and said vessel sidewall; and a distributor plate positioned within said vessel between said fluid inlet and below said electrodes, the distributor plate being configured to cause fluid to flow through said annular passageway in a spiral pattern.

15. An apparatus for augmenting the coalescence of a component of a mixture according to claim 14 wherein said distributor plate includes spaced apart radially extending vanes, each vane having a plane that is at an angle relative to a plane of said vessel cylindrical axis.

16. An apparatus for augmenting the coalescence of a component of a mixture according to claim 14 wherein said distributor plate is in a plane at least substantially perpendicular to said vessel cylindrical axis and has a plurality of spaced apart openings therethrough, and including:

a plurality of short length pipes, one for each of said openings, a first end of each of said pipes being affixed to said distributor plate in register with one of said openings, a second end of each of said pipes being open, each pipe being inclined at an angle to said distributor plate, fluid flow from said inlet through said pipes having a spiral flow path imparted to it.

17. An apparatus for augmenting the coalescence of a component of a mixture according to claim 14 wherein at least one of said electrodes is supported at a lower end thereof by said distributor plate.

18. An apparatus for augmenting the coalescence of a component of a mixture according to claim 14 including an elongated second tubular electrode of external diameter less than said first mentioned tubular electrode and supported concentrically within and in electrical isolation with said first mentioned tubular electrode and providing a second annular flow path between said first and second tubular electrode, said distributor plate being configured to cause fluid flowing through said second annular flow path to flow in a spiral path.

19. An apparatus for augmenting the coalescence of a component of a mixture according to claim 18 wherein said vessel sidewall and said second tubular electrode are grounded and wherein an electrical potential is applied to said first mentioned tubular electrode and said cylindrical electrode.

20. An apparatus for augmenting the coalescence of a component of a mixture according to claim 14 wherein at least one of said fluid inlet and said fluid outlet is positioned concentrically with said vessel.

* * * * *